April 19, 1966 P. A. MARTIN 3,246,859
AUTOMATIC FISHING REEL ASSEMBLY
Filed Dec. 17, 1962 3 Sheets-Sheet 1
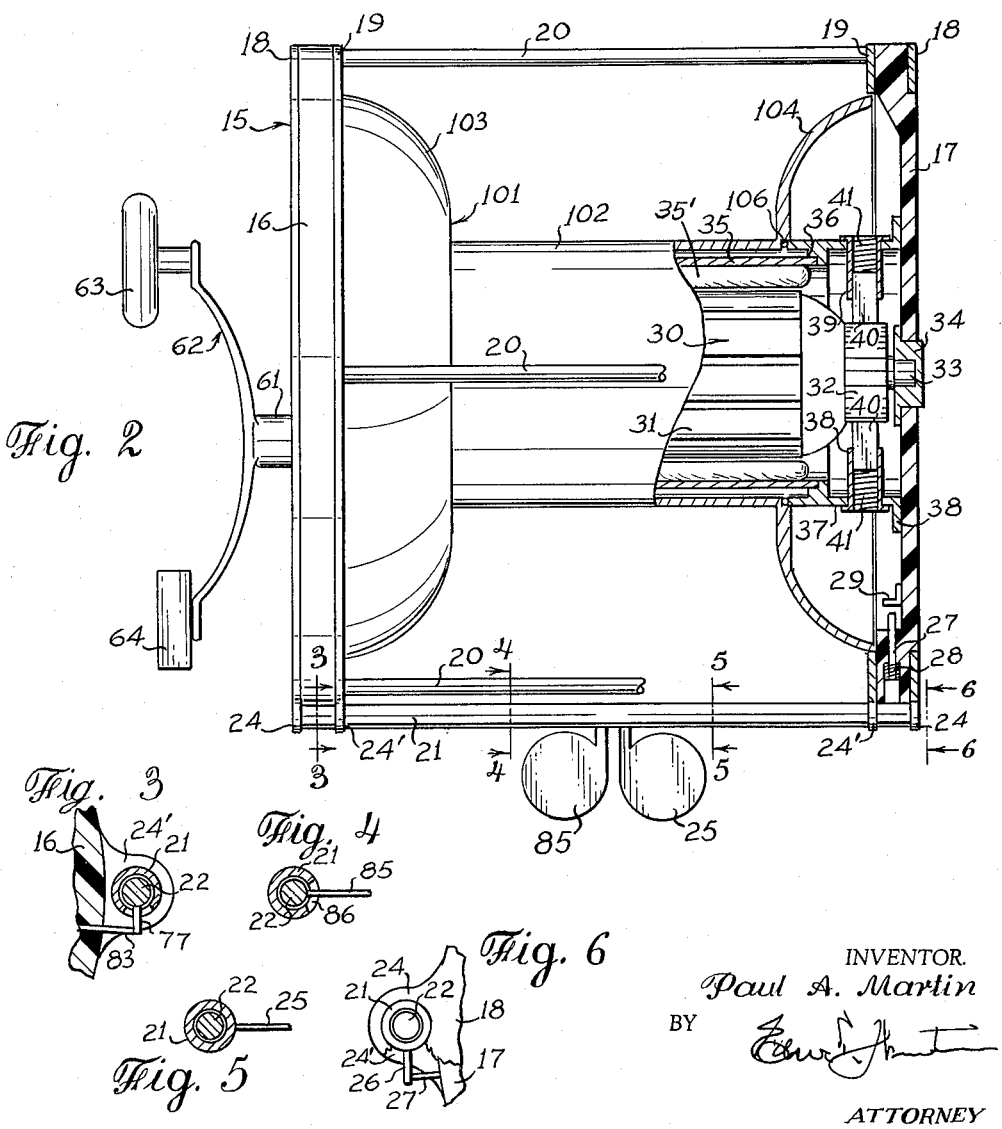
INVENTOR.
Paul A. Martin
BY
ATTORNEY

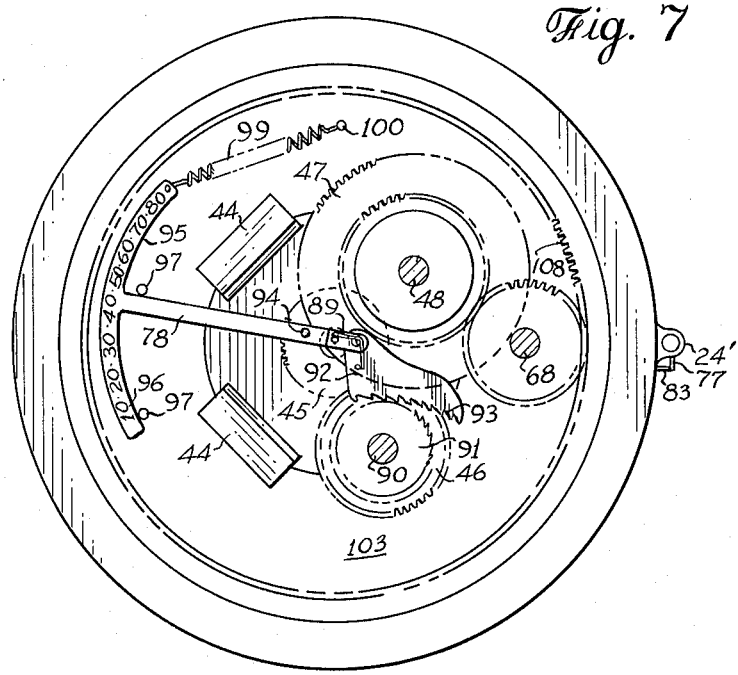

April 19, 1966 P. A. MARTIN 3,246,859
AUTOMATIC FISHING REEL ASSEMBLY
Filed Dec. 17, 1962 3 Sheets-Sheet 3

INVENTOR.
Paul A. Martin
BY
ATTORNEY

United States Patent Office 3,246,859
Patented Apr. 19, 1966

3,246,859
AUTOMATIC FISHING REEL ASSEMBLY
Paul A. Martin, 2013 Yucca Drive, Decatur, Ga.
Filed Dec. 17, 1962, Ser. No. 245,019
4 Claims. (Cl. 242—84.54)

This invention relates to fishing equipment, and is more particularly concerned with an automatic fishing reel assembly.

In the past, electric motors have been employed to rewind fishing reels. Such prior art devices have usually included simply a conventional reel and an electric motor mounted on one side of the reel and engageable with a drive shaft thereof so as to drive the reel. Such prior art devices are usually very heavy and are asymmetrical so that the electric motor weights one side of the reel, thereby making it difficult for an operator to hold a pole or rod containing the reel in the usual upwardly extending position. The prior art electrical reels, with continued use, tend to become corroded inside, and are cumbersome to operate because of the inaccessibility of controls.

Briefly described, the present invention includes a reel assembly wherein the reel is carried on a rod having batteries therein. The spool of the reel has a hollow cylindrical hub, within which is an electric motor. The shaft of the electric motor protrudes outwardly of the spool and drives a gear train which, in turn, drives the spool for rewinding. In the gear train is a clutch so that the spool may be disengaged from the motor, and a slip clutch by means of which the tension on the line may be varied as desired. The reel also includes a mechanism by which the amount of tension on the line can be read directly from the reel and a crank assembly whereby the tension on the line can be varied as desired, the crank assembly acting as an auxiliary rewind mechanism by means of which the spool may be manually rewound. The actuation of the spool is effected by a pair of juxtaposed levers which protrude from the rear of the reel, one lever serving to close the switch to the motor for causing the spool to be rewound and the other lever functioning to actuate the clutch so that the line on the spool may be paid out.

Accordingly, it is an object of the present invention to provide an automatic reel which may be operated by one hand while holding the rod containing the reel.

Another object of the present invention is to provide a reel in which the power unit therefor is sealed from outside moisture and is symmetrical with respect to the reel assembly so that the reel will not be weighted on one side or the other to a great extent.

Another object of the present invention is to provide a a lightweight reel which is suitable for trolling or casting, the reel being inexpensive to manufacture, durable in structure and efficient in operation.

Another object of the invention is to provide a reel in which a preselected tension may be set on the reel and in which the amount of tension is visually indicated to the operator.

Other objects, features and advantages of the present invention will be apparent from the following description when taken in conjunction with the accompanying drawings wherein like characters of reference designate corresponding parts throughout the several views and wherein:

FIG. 1 is a perspective view of a reel assembly constructed in accordance with the present invention.

FIG. 2 is a partially broken top plan view of the reel mechanism shown in FIG. 1.

FIG. 3 is a cross sectional view taken along line 3—3 in FIG. 2.

FIG. 4 is a cross sectional view taken along line 4—4 in FIG. 2.

FIG. 5 is a cross sectional view taken along line 5—5 in FIG. 2.

FIG. 6 is a cross sectional view taken along line 6—6 in FIG. 2.

FIG. 7 is a side elevational view of one side of the reel mechanism shown in FIGS. 1 and 2, the side plate of the reel mechanism being removed to disclose the interior thereof.

FIG. 8 is a fragmentary, partially broken away top plan view of the mechanism shown in FIG. 7.

Figure 9:
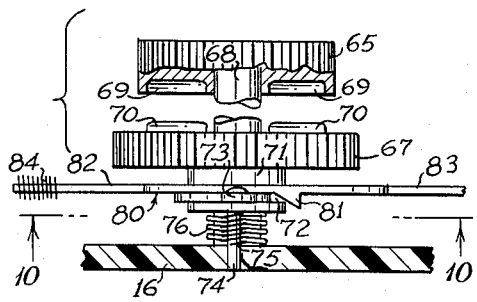
FIG. 9 is an exploded view of a detail showing the clutch mechanism of the reel of the present invention.

Referring now in detail to the embodiment chosen for the purpose of illustrating the present invention, it being understood that in its broader aspects the present invention is not limited to the exact details herein depicted, numeral 12 denotes generally a conventional deep sea fishing rod which, according to the present invention, is provided with a hollow handle 13, the handle 13 receiving a plurality of tandem arranged batteries 14 for supplying electrical power to the reel mechanism denoted generally by numeral 15. It will be understood, of course, that other sources of electrical power for energizing reel mechanism 15 may be employed.

Referring now to FIG. 2, it will be seen that the reel mechanism 15 includes a reel housing having a pair of opposed side plates 16 and 17 which are complementary circular disks formed of plastic or other electrically nonconducting material. The outer and inner faces of plates 16 and 17 are respectively provided with annular rings 18 and 19 along the peripheral portions thereof. Extending between the inner rings 19 is a plurality of tie rods 20 which function in their usual way to space the plates 16 and 17 apart. In addition, there is a rear tie rod 21 along the rear edge of the reel mechanism, the tie rod 21 being hollow and rotatable so as to receive therein an inner rod 22. The tie rod 21 is journalled by its ends in aligned eyelets 24 and 24' which project rearwardly from the rings 18 and 19.

Connected to the rotatable rear tie rod 21 is a rearwardly extending flat motor actuator lever 25, by means of which the tie rod 21 may be rotated, as desired. Between the right hand pair of eyelets 24 and 24' is a downwardly projecting finger 26, the inner side of which engages the end of a plunger 27 slidably carried in a radially disposed aperture in the side plate 17. The plunger 27 is normally urged outwardly into engagement with the finger 26 by means of a spring 28 so that the inner end of the plnger 27 is held, under normal conditions, in spaced relationship from an electrical terminal 29 carried by the side plate 17. When the lever 25 is depressed, it rotates the rod 21 so as to urge the finger 26 against the plunger 27, thereby causing the plunger 27 to engage the terminal 29. Thus, a normally open switch is provided which is closeable upon depression of lever 25.

The plunger 27 is electrically connected to one terminal of the batteries 14 through an electric wire (not shown), while the terminal 29 is electrically connected to the other terminal of battery 14, through a motor, denoted generally by numeral 30. Thus, when the switch is closed the motor 30 is actuated.

The motor 30 includes an armature 31 having a commutator 32 and a central shaft 33. As seen in FIG. 2, one end of shaft 33 is carried by a bearing 34 mounted at the center of the side plate 17. The motor 30 also includes a hollow cylindrical open ended casing 35, which carries the field coil 35' of the motor 30, one end of casing 35 abuts an annular shoulder 36 of a hollow cylindrical brush housing 37. The brush housing 37 has at its outer end an annular outwardly extending flange 38 which abuts against the inner surface of the side plate 17 and is secured thereto. Tubular brush guides 39 protrude inwardly toward the commutator 32 and are provided with brushes 40 which are urged inwardly against the commutator 32 by springs 41, the springs 41 being received within the hollow tubular brush casings 40 so as to act against the end cap of these casings 40.

The winding of the field coil 35' and the armature 31 is conventional and may be such as to provide a series, a shunt wound or a compound wound motor 30, whichever is desired. Suffice it to state that one electrical terminal of the motor 30 is electrically connected to one terminal of battery 14 and the other terminal to terminal 29.

The other end of the hollow cylindrical casing 35 abuts against a flat disc shaped bearing plate 42 which is disposed inwardly of but adjacent the side plate 16. The bearing plate 42 has a centering ring 43 which is affixed thereto and maintains the casing 35 in its concentric relationship to the shaft 33 of the motor 30. The bearing plate 42 is supported in its position by a pair of reinforcing straps 44 which extend inwardly from the side plate 16.

The shaft 33 protrudes through a central opening in the bearing plate 42 and is provided at its end with a gear or cog wheel 45, the cog wheel 45 driving an idler cog wheel 46 which, in turn, drives a cog wheel 47. The size of the gears or cog wheels 45, 46 and 47 is such that the speed of rotation of the motor 33 is stepped down, the cog wheel 47 being relatively large and being mounted on a stub shaft 48 which protrudes through the bearing plate 42 and is retained in place by a keeper ring 49 thereon. The central portion of cog wheel 47 is provided with an aperture which receives the inner end of a clutch shaft 50 of a slip clutch 120 for rotation with the cog wheel 47. The clutch shaft 50 is substantially cylindrical in shape, being flattened on opposite sides in the present invention. A plurality of discs 51 and 52 is received on the shaft 50, the discs 51 being provided with central openings 53 which are of essentially the same shape as shaft 50 and hence are rotated upon rotation of shaft 50. Between each pair of discs 51 is an idler disc 52 which has round central apertures 54 of sufficiently large diameter that shaft 50 is freely rotatable therein. Thus, each disc 52 need not rotate with the shaft 50.

It is now seen that the discs 52 are interposed between the discs 51 and that the discs 51 are driven, through the gear train heretofore described, from the motor 30. The discs 52, on the other hand, are freely rotatable on shaft 50 and are driven only when urged against the discs 51. Each disc 52 is provided with a pair of diametrically opposed outwardly projecting fingers 55 which are received in opposed slots 56 in an annular gear 57, the annular gear 57 having a front plate 58 thereon. In more detail, the annular gear 57 is provided with external teeth, the opposed slots 56 being on the inner periphery of the annular gear 57. The gear 57 is sufficiently wide that it may received all discs 52 therein—hence, the discs 52, when engaged by the discs 51, rotate the gear 57. For adjusting the clamping force between the discs 51 and 52, the shaft 50, at its outer end, is provided with threads 60 which receive thereon a tensioning cap 61, the tensioning cap 61 protruding through an appropriate aperture in side 16 to terminate outwardly thereof. The cap 61 is provided with an appropriate hand crank 62, having a handle 63 and a counterweight 64 thereon. The handle 63 may be rotated to provide the proper tension on the line of the reel so that the line will not be broken when the reel is reeling in a fish. In other words, upon rotation of the crank 62, the cap 61 will exert force against the front plate 58 of the gear 57, urging it inwardly toward the face or outer surface of cog wheel 47, thereby clamping the discs 51 and 52 together more firmly. Upon rotation in the opposite direction, the cap 61 will be loosened so as to relieve the pressure between the discs 51 and 52. During threaded adjustment of the cap 61, the shaft 50 is retained against rotation with the cap by frictional resistance of the cog wheel 47 and its intermediate cog wheels or by manual retention of the reel spool 101.

The teeth 59 of gear 57 mesh with the teeth of a gear 65 of the clutch mechanism 66, the clutch mechanism 66 including a second and slightly larger gear 67 which is concentric with and in juxtaposition with the gear 65. A common shaft 68 extends through both gears and is firmly embedded in the side plate 16 so that the gears 65 and 67 are freely rotatable thereon. As seen in FIG. 9, the gear 65 is provided with a plurality of radial recesses 69 which receive a like number of radial extending protrusions 70 on the inner face of gear 67. Thus, when gears 65 and 67 are contiguous, they must rotate together. On the other hand, when gear 67 is moved away from gear 65, the gear 67 is no longer rotated by the gear 65.

Gear 67 is provided with a hub 71 which extends outwardly, the hub being provided with a peripheral groove 72 which receives the central crescent shaped portion of a control bar 73. The control bar 73 has a pair of diametrically oppositely extending arms, the outer ends of which journal a pair of anchoring pins 74 protruding inwardly from plate 16, above and below shaft 68. Springs 75, which surround the anchoring pins 74, urge the control arm 73 inwardly. Likewise, a coil spring 76, surrounding the shaft 68 between the end of hub 71 and the inner surface of side plate 16, urges the gear 67 into engagement with the gear 65. Thus, under normal conditions, the gear 67 is urged into meshing relationship with the gear 65 so that they are locked together and will rotate in unison. If, however, the actuator bar or control bar 73 is urged outwardly, it will move the gear 67 outwardly against the force of springs 75 and 76.

Figure 10:
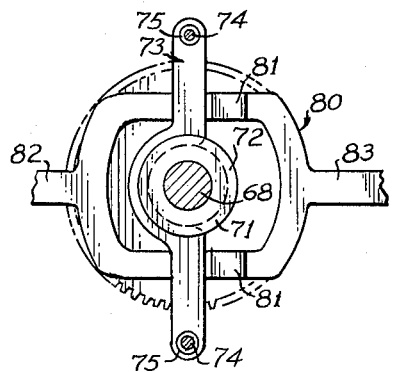
FIG. 10 is a cross sectional view taken along line 10—10 in FIG. 9.
Figure 11:
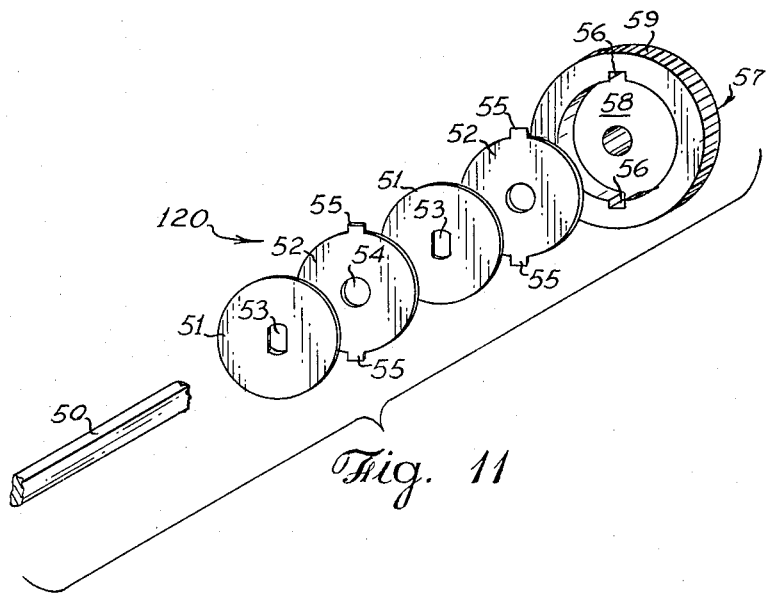
FIG. 11 is an exploded perspective view of the slip clutch mechanism of the reel of the present invention.

For moving the gear 67 outwardly, and thereby disengaging it from gear 65, there is a yoke 80 which is a flat metal member having an open central portion which receives the hub 71. Thus, the central portion of the yoke 80 is disposed between the gear 67 and the control bar 73. At each side of the opening in yoke 80, the yoke 80 is provided with outwardly extending camming fingers 81. The camming fingers are on each side of the hub 71 so as to be moved simultaneously, upon sidewise movement of the yoke 80, into and out of engagement with the control bar 73. In more detail, when the yoke 80 is moved to the right in FIG. 10, the camming fingers 81 are disposed to the right of the control bar 73; hence, the gear 67 is under the control of springs 75 and 76 and will be urged into engagement with the gear 65. However, when the yoke 80 is moved to the left in FIG. 9, the camming fingers 81 engage the arms of the control bar 73 so as to urge them outwardly, thereby moving the gear 67 outwardly, out of engagement with the gear 65. The yoke 80 has a pair of guide arms 82 and 83 which extend in opposite directions, the guide arm 82 extending inwardly and being provided with a spring 84 at its inner end so that the yoke 80 is urged by spring 84 to the position shown in FIG. 10.

The guide arm 83 protrudes outwardly, as seen in FIG. 8, so that it may be engaged by a downwardly protruding lever 77, seen in FIG. 3, the downwardly protruding lever 77 being carried by a shaft 22. The central portion of shaft 22 is provided with a control lever 85 which protrudes rearwardly, as seen in FIG. 2, the rod 21 being provided with an appropriate slot 86, seen in FIG. 4, through which the lever 85 protrudes. It will be understood that the arms 82 and 83 of yoke 80 are journalled by the side plate 16 and that spring 84 reacts against the plate 16 and normally urges the yoke 80 outwardly so that the lever 85 is held up, until depressed. When the lever 85 is depressed, it rotates shaft 22 and moves lever 77 inwardly, as viewed in FIG. 3, to move the yoke 80 to the left in FIG. 10 so that the gear 67 may be disengaged from gear 65. Upon release of lever 85, the spring 84 returns the yoke and the lever mechanism to its original position.

Referring now to FIG. 7, it will be seen that the shaft 90 which carries the idler cog wheel 46 is provided with a ratchet 91 of a tension or torque indicating mechanism, the ratchet 91 being fixed with respect to gear or cog wheel 46 so as to rotate therewith on shaft 90. The shaft 90, in turn, is fixed between the plates 16 and 42. Mounted adjacent the ratchet wheel 91 is a ratchet engaging pawl finger 92 which is a triangular shaped member having a slightly concaved inner surface provided with teeth 93, the teeth 93 engaging the teeth of the ratchet wheel 91. The finger 92 is pivotally mounted to the inner end of a tension indicating lever 78 so that the teeth 93 are spaced from the axis of lever 78, and a spring 89 extending between the finger and the lever 78 urges the finger into engagement at all times with the ratchet wheel 91. Outwardly of finger 92, the lever 78 is mounted on a pivot pin 94 carried by the side plate 16 and is provided, at its outer end, with an arcuate indicator plate 95 having indicia or visual means 96 therein for indicating generally the tension in pounds on the line to tend to rotate spool 101. It will be appreciated that the indicia 95 while calibrated for pounds of tension on the yarn, actually indicate torque on the spool 101 when tending to rotate to pay out the line. Thus, the variation in effective diameter of the line on the spool may cause some variation in the accuracy of the reading. Lever 78 is adapted to swing between limiting pins 97 which extend out from the inner surface of side plate 16. The side plate 16 is provided with an appropriate window 98 of arcuate configuration commensurate with at least one-half of the arcuate indicator plate 95 so that any one of the indicia 96 when aligned therewith may be viewed therethrough. A spring 99 extending between a pin 100 and the end of member 95 urges the lever 78 in a clockwise direction, as viewed in FIG. 7, and hence urges the finger 92 to tend to rotate the ratchet 91 in a clockwise direction. When, however, the ratchet 91 is rotated counterclockwise, it moves the finger 92 outwardly, and the finger 92, in turn, pivots the lever 78 against the tension of spring 99. When the slip clutch 120 begins to slip, no additional rotational force is applied to ratchet 91.

Referring to FIGS. 2 and 8, it will be seen that the spool 101 includes a hollow cylindrical body or hub 102 which surrounds and is concentric with the casing 35 of motor 30. The ends of the body 102 are provided with outwardly flaring end plates 103 and 104 which extend diametrically and then flare outwardly so as to terminate adjacent the annular rings 19. Ball bearings 105 and 106, between the ends of the body 102 and the brush housing 37 and bearing plate 42, limit the sidewise movement of the body 102 to provide for free rotation of spool 101 about its axis. The end plate 103 is provided, as seen in FIG. 8, with an annular shoulder 107, the shoulder 107 being provided with internal teeth 108 which mesh with the teeth of gear 67.

*Operation*

From the foregoing description, the operation of the present device should be apparent. The reel mechanism 15 is mounted by an appropriate means to the rod 12, and the batteries 13 are installed in the handle 14 of the rod so that electric power is provided through the switch elements 27 and 29 to rotate the motor 30 upon depression of the lever 25. The usual fishing line (not shown) is wrapped around the spool 101 and is passed through appropriate eyelets (not shown) to the end of the rod 12. The usual lure (not shown) is connected to the end of the line. To permit the line to be paid out, the lever 85 is depressed, thereby urging the yoke 80 inwardly to move gear 67 away from gear 65 and thereby disengage it from the remaining gear train. Since gear 67 is the only gear meshing with the teeth 108 of the spool 101, the reel is now free to rotate and hence such line as is necessary may be paid out from spool 101. When the line is reeled off reel 101, the lever 85 is released, and hence is returned by the action of spring 84 against the yoke 80 to its normal position. This, in turn, moves the yoke 80 to the right in FIG. 10 sufficiently to permit the gear 67 to be urged by spring 76 into engagement with the gear 65. Hence, the gear train from the motor 30 is completed via the brake, or slip clutch denoted generally by numeral 120.

The amount of tension on the line may be tested, at this time, by simply pulling upon the line. Any force exerted on the spool 101 by the line will be transmitted via the gears 67, 65 to the gear 57 and thence through the slip clutch 120 to the idler gear or cog wheel 46 and thence through cog wheel 46 to the shaft 33 of motor 30. Any rotation of the cog wheel 46 in a counterclockwise direction, as viewed in FIG. 7, will urge the finger 92 to the left in FIG. 7 and hence tend to rotate the lever 78 in a counterclockwise direction. Such rotation, however, is resisted by the spring 99; hence, eventually, after the lever 78 has been pivoted downwardly by an amount proportional to the tension on spring 99, therefore proportional to the force applied for rotating the spool 101, the slip clutch 120 will begin to slip, due to the looseness of the engagement between the discs 51 and 52. At that time, a particular indicium 96 is aligned with the window 98 and will give a visual indication of torque on spool 101 and relates generally to the force in pounds exerted on the line, immediately prior to the time that the clutch 120 begins to slip. If additional tension is desired to be applied to the line, the handle 63 is rotated so as to rotate the cap 61 to tighten it upon the shaft 50 and thereby urge the gear 57 inwardly toward the gear 47. This clamps the discs 51 and 52 more firmly together and thus additional force on the line is necessary in order to cause a slippage between the discs 51 and 52. If, on the other hand, less tension is desired on the line, the handle 63 is rotated in the opposite direction so that the discs 51 and 52 are more loosely clamped together.

When it is desired to reel in the line, the lever 25 is depressed so that the plunger 27 is moved inwardly into engagement with the terminal 29 to close the switch and supply electricity to energize the motor 30. Thus, the motor 30 begins to rotate in a direction such that the ratchet wheel 91 is free to rotate with respect to the finger 92. The rotation of the shaft 33 of the motor 30 through the gear train rotates the gear 67 and hence rotates via the teeth 108 the spool 101. The rotation of motor 30 incidentally rotates the cap 61 therewith. Thus, as the line is reeled in, the crank 62 is rotated. If, during the period that the lever 25 is depressed and hence the motor 30 is rotating to reel in the line, it is desired to apply additional tension on the line, the handle 63 is rotated faster that it is normally rotating to tighten the cap 61 on shaft 50. If, on the other hand, less tension is desired on the line, the handle 63 is simply arrested for a short period of time which permits the shaft 50 to rotate with respect to the cap 61 for a short period of time.

Furthermore, if the motor 30 does not function properly and does not rotate the spool, the spool 101 may be rotated manually by rotation of the handle 63. Of course, the first portion of the rotation of handle 63 will simply tighten the clutch 120 to its fullest extent, and, thereafter, the rotation of handle 63, i.e. crank 62, will rotate the gear train carrying the motor as a drag on the gear train. This, however, will permit the manual operation of reel 101.

When lever 25 is released, the spring 28 will return the plunger 27 to its original position as shown in FIG. 2 and thereby break the circuit to motor 30.

It is now seen that I have provided a very efficient and easily operated automatic reel assembly which is entirely self contained and may be operated entirely by one hand. For example, when it is desired to use the reel assembly for casting purposes, the handle 13 of rod 12 is grasped in the usual way and the rod 12 manipulated so as to throw the lure away from the operator. Simultaneously therewith, the thumb of the person is pressed against the lever 85 to release the clutch at the proper time to permit free rotation of the reel in paying out the line. On the other hand, the same thumb may be utilized for depressing the lever 25 for reeling in the line. It will also be observed that the reel 15 of the present invention is essentially symmetrical and may be mounted upon the rod 12 in the usual way without any unbalancing effect. The motor 30 is essentially to the right in FIG. 2 while the gear train and the crank 62 are to the left, thereby counterbalancing each other.

Furthermore, when a fish is being reeled in, the tension indicating mechanism may be periodically read by stopping reeling in operation so that the spool 101 tends to be rotated to pay out the line, then the indicia 96 may be read through the window 98. Hence, if excessive forces are applied to the line, this may be adjusted during the period in which the fish is being reeled in.

It will be obvious to those skilled in the art that many variations may be made in the single embodiment here chosen for the purpose of illustrating the present invention without departing from the scope thereof as defined by the appended claims.

I claim:

1. In a fishing reel assembly, a reel housing, means for securing said reel housing to a fishing rod, a spool within said reel housing rotatable upon its axis, said spool having a hollow hub, a motor disposed within said hollow hub and mounted on said housing, said motor having a shaft extending from one end thereof, a gear train driven from said motor, a slip clutch within said gear train, a clutch mechanism within said gear train, said spool being provided with internal teeth driven from said gear train, said motor when energized being rotatable to drive said gear train in a direction to wind line on said spool, and a torque indicating mechanism connected to said gear train between said clutch mechanism and said motor for indicating the amount of force applied to said gear train from said spool in the other direction, said torque indicating mechanism including a ratchet in the gear train for rotation therewith, a pawl engaging said ratchet, a lever carrying said pawl, spring means for urging said lever to its normal position, said pawl being movable by said ratchet upon rotation of said gear train in said other direction for moving said lever against the spring force of said spring means, and visual means for indicating the position of said lever.

2. In a fishing reel assembly, a reel housing, means for securing said reel housing to a fishing rod, a spool within said reel housing rotatable upon its axis, said spool having a hollow hub, a motor disposed within said hollow hub and mounted on said housing, said motor having a shaft extending from one end thereof, a gear train driven from said motor, a slip clutch within said gear train, a clutch mechanism within said gear train, said spool being provided with internal teeth driven from said gear train, said motor when energized being rotatable to drive said gear train in a direction to wind line on said spool, and a torque indicating mechanism connected to said gear train betwen said clutch mechanism and said motor for indicating the amount of force applied to said gear train from said spool in the other direction, said torque indicating mechanism including a ratchet in the gear train for rotation therewith, a pawl engaging said ratchet, a lever carrying said pawl, spring means for urging said lever to its normal position, said pawl being movable by said ratchet upon rotation of said gear train in said other direction for moving said lever against the spring force of said spring means, and visual means for indicating the position of said lever, said slip clutch including a plurality of juxtaposed concentric discs, certain of said discs being connected for driving from said motor and the other of said discs being connected for driving said spool via said clutch mechanism and means for variably clamping said discs together.

3. In a fishing reel assembly, a reel housing, means for securing said reel housing to a fishing rod, a spool within said reel housing rotatable upon its axis, said spool having a hollow hub, a motor disposed within said hollow hub and mounted on said housing, said motor having a shaft extending from one end thereof, a gear train driven from said motor, a slip clutch within said gear train, a clutch mechanism within said gear train, said spool being provided with internal teeth driven from said gear train, said motor when energized being rotatable to drive said gear train in a direction to wind line on said spool, and a torque indicating mechanism connected to said gear train between said clutch mechanism and said motor for indicating the amount of force applied to said gear train from said spool in the other direction, said torque indicating mechanism including a ratchet in the gear train for rotation therewith, a pawl engaging said ratchet, a lever carrying said pawl, spring means for urging said lever to its normal position, said pawl being movable by said ratchet upon rotation of said gear train in said other direction for moving said lever against the spring force of said spring means, and visual means for indicating the position of said lever, said slip clutch including a plurality of juxtaposed concentric discs, certain of said discs being connected for driving from said motor and the other of said discs being connected for driving said spool via said clutch mechanism, and means for variably clamping said discs together, said clutch mechanism including a pair of juxtaposed concentric gears engageable and disengageable with each other, one of said gears being connected for driving from said clutch mechanism.

4. In a reel assembly of the type having a housing which contains for rotation a spool and an electric motor for rotating said spool, a switch for actuating and deactuating said motor and a clutch for engaging and disengaging said motor and said spool, the combination therewith of a hollow tie rod extending across the back portion of said housing, said tie rod being rotatable about its axis and being provided with a slot, an inner rod rotatably carried within the hollow portion of said tie rod, a first lever connected to said inner rod and projecting through said slot, a second lever juxtaposed with respect to said first lever for rotating said tie rod, said tie rod and said inner rod being connected to said switch and said clutch for energizing said motor when one of the levers is depressed and for disengaging said clutch when the other of said levers is depressed.

References Cited by the Examiner
UNITED STATES PATENTS

| | | | |
|---|---|---|---|
| 902,447 | 10/1908 | Piper | 43—21 |
| 942,006 | 11/1909 | Morehead | 73—143 |
| 1,062,488 | 5/1913 | McCluer et al. | |
| 1,570,931 | 1/1926 | Young | 73—143 |
| 2,024,147 | 12/1935 | Curtiss | 73—143 |
| 2,190,398 | 2/1940 | Bugatti. | |
| 2,262,637 | 11/1941 | Fanshier. | |
| 2,470,507 | 5/1949 | Luton. | |
| 2,614,420 | 10/1952 | Miller | 73—143 |
| 2,760,736 | 8/1956 | Mihalko et al. | |
| 2,866,291 | 12/1958 | Duell | 43—21 |
| 3,017,134 | 1/1962 | Duvall | 242—84.1 X |
| 3,030,046 | 4/1962 | Moghadam | 242—84.1 X |
| 3,116,892 | 1/1964 | Pickard | 242—84.1 |

MERVIN STEIN, *Primary Examiner.*

DONALD W. PARKER, *Examiner.*